(12) United States Patent
Tseng et al.

(10) Patent No.: US 12,003,198 B2
(45) Date of Patent: Jun. 4, 2024

(54) MOTOR DETECTION METHOD AND MOTOR DETECTION DEVICE

(71) Applicant: Delta Electronics, Inc., Taoyuan (TW)

(72) Inventors: Shao-Kai Tseng, Taoyuan (TW); Yuan-Qi Hsu, Taoyuan (TW); Chen-Yeh Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/890,537

(22) Filed: Aug. 18, 2022

(65) Prior Publication Data
US 2023/0291342 A1  Sep. 14, 2023

(30) Foreign Application Priority Data
Mar. 10, 2022  (CN) .......................... 202210231182.8

(51) Int. Cl.
*H02P 6/20* (2016.01)
*H02P 1/48* (2006.01)
*H02P 6/16* (2016.01)
*H02P 21/22* (2016.01)

(52) U.S. Cl.
CPC ................ *H02P 21/22* (2016.02); *H02P 1/48* (2013.01); *H02P 6/16* (2013.01)

(58) Field of Classification Search
CPC ............... H02P 21/22; H02P 1/48; H02P 6/16
See application file for complete search history.

(56) References Cited

U.S. PATENT DOCUMENTS

| | | | |
|---|---|---|---|
| 2007/0216335 A1* | 9/2007 | Takemori | H02P 8/12 318/685 |
| 2008/0309268 A1* | 12/2008 | Morimoto | H02P 6/20 318/400.32 |
| 2018/0138842 A1* | 5/2018 | Sun | G01D 5/142 |

FOREIGN PATENT DOCUMENTS

TW          202037063 A         10/2020

OTHER PUBLICATIONS

Office Action dated Oct. 12, 2022 in TW Application No. 111108707, 4 pages.

* cited by examiner

*Primary Examiner* — Cortez M Cook
(74) *Attorney, Agent, or Firm* — MUNCY, GEISSLER, OLDS & LOWE, PC (57) ABSTRACT

A motor detection method includes the following steps. An excitation current command is provided to a motor device, and the motor device is driven to rotate at the first angle. The first feedback angle of the motor device in the first resting position is detected and obtained. The motor device is driven to rotate at the second angle according to the excitation current command. The second feedback angle of the motor device in the second resting position is detected and obtained. The magnetic pole offset angle of the motor device is calculated according to the first feedback angle and the second feedback angle.

12 Claims, 5 Drawing Sheets

MOTOR DETECTION METHOD AND MOTOR DETECTION DEVICE

CROSS REFERENCE TO RELATED APPLICATIONS

This application claims priority of China Patent Application No. 202210231182.8, filed on Mar. 10, 2022, the entirety of which is incorporated by reference herein.

BACKGROUND

Field of the Invention

The present invention relates to a detection method and a detection device, and in particular it relates to a motor detection method and a motor detection device for detecting magnetic pole offset angles.

Description of the Related Art

Due to the difference in phase-sequence definitions and manufacturers, the position sensor of a synchronous motor may have a fixed angle deviation between the feedback position and the actual position. This is generally called the magnetic pole offset angle. Therefore, the inverter usually has a learning function for the magnetic pole offset angle. By setting the correct magnetic pole offset angle, the feedback angle can be corrected, and the correct rotor angle may be used for driving, so as to improve the control performance of the motor drive system.

On the other hand, the permanent magnet-assisted synchronous reluctance motor (PMaSynRM) is mainly based on magnetic conductive materials and supplemented by permanent magnet materials in the rotor structure of the synchronous motor. However, the torque characteristics of the permanent magnet assisted synchronous reluctance motor make it unsuitable for the traditional magnetic pole offset angle learning method, and the correct magnetic pole offset angle may not obtained. Therefore, how to effectively detect and obtain the magnetic pole offset angle has become an important issue.

SUMMARY

An embodiment of the present invention provides a motor detection method and a motor detection device, thereby effectively detecting and obtaining the correct magnetic pole offset angle, so as to reduce the self-learning time and improve the learning accuracy.

An embodiment of the present invention provides a motor detection method suitable to detect a motor device. The motor detection method includes the following steps. An excitation current command is provided to the motor device, and the motor device is driven to rotate at the first angle. The first feedback angle of the motor device in the first resting position is detected and obtained. The motor device is driven to rotate at the second angle according to the excitation current command. The second feedback angle of the motor device in the second resting position is detected and obtained. The magnetic pole offset angle of the motor device is calculated according to the first feedback angle and the second feedback angle.

An embodiment of the present invention provides a motor detection device suitable to detect a motor device. The motor detection device includes a controller and an encoder. The controller is configured to provide an excitation current command to a motor device, drive the motor device to rotate at the first angle, and drive the motor device to rotate at the second angle. The encoder is configured to detect and obtain the first feedback angle of the motor device in the first resting position and at the second feedback angle of the motor device in the second resting position. The controller calculates the magnetic pole offset angle of the motor device according to the first feedback angle and the second feedback angle.

According to the motor detection method and the motor detection device disclosed by the present invention, the excitation current command is provided to the motor device and the motor device is driven to rotate at the first angle. The first feedback angle of the motor device in the first resting position is detected and obtained. The motor device is driven to rotate at the second angle according to the excitation current command. The second feedback angle of the motor device in the second resting position is detected and obtained. The magnetic pole offset angle of the motor device is calculated according to the first feedback angle and the second feedback angle. Therefore, the correct magnetic pole offset angle may be effectively detected and obtained, so as to reduce the self-learning time and improve the learning accuracy, and the above magnetic pole offset angle may be used for correction to improve the driving performance of the motor device and the fault tolerance of the inverter.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents an element or component that is the same or similar.

Figure 1:
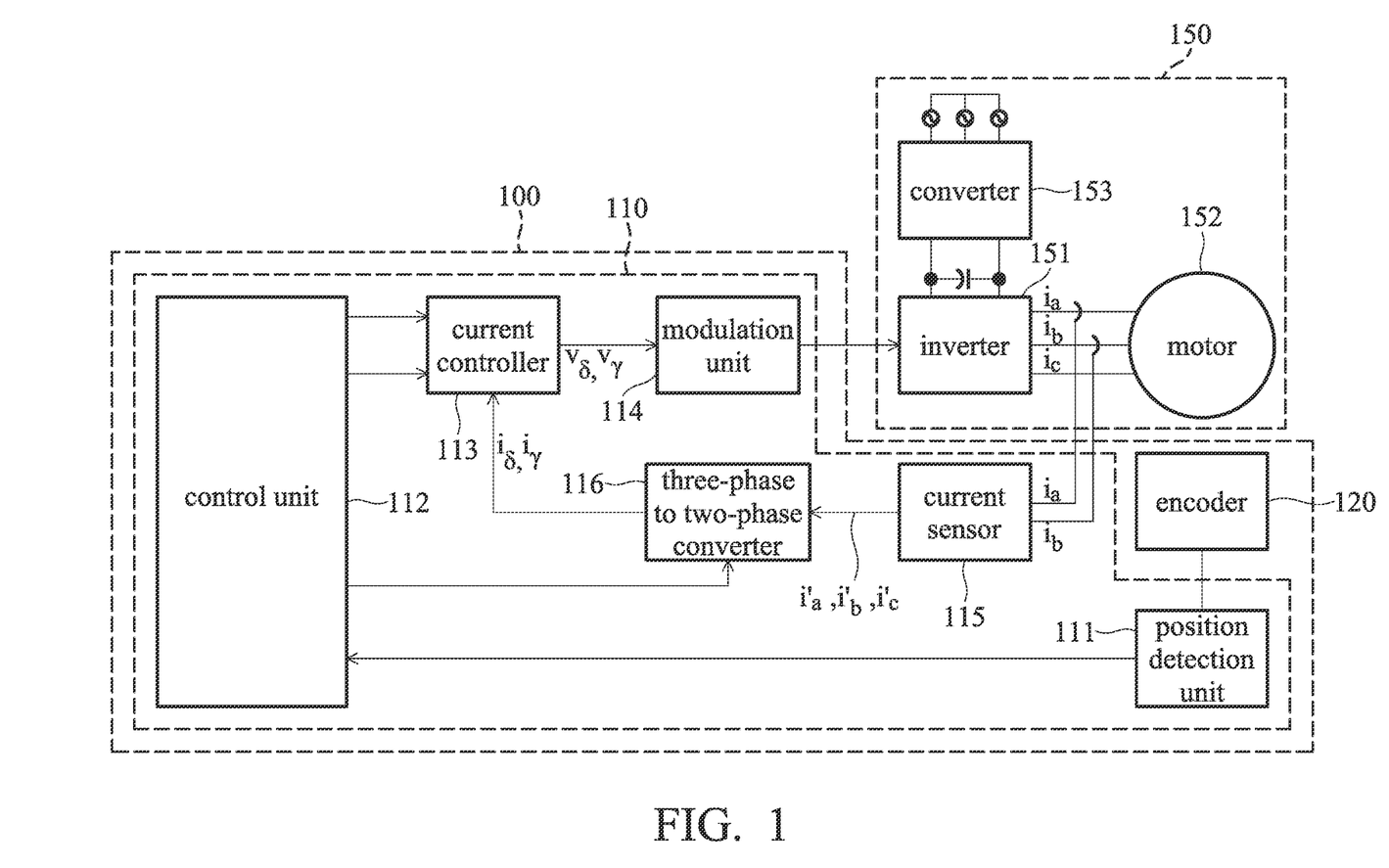
FIG. 1 is a schematic view of a motor detection device according an embodiment of the present invention.

FIG. 1 is a schematic view of a motor detection device according an embodiment of the present invention. In the embodiment, the motor detection device 100 is suitable to detect a motor device 150, wherein the motor 150 may include an inverter 151 and a motor 152. The inverter 151 may output an excitation current according to an excitation current command to drive the motor 152, so that the motor 152 operates. In the embodiment, the excitation current may be three-phase currents $i_a$, $i_b$ and $i_c$.

In some embodiments, the motor 152 is, for example, permanent magnet assisted synchronous reluctance motor (PMaSynRM), but the embodiment of the present invention is not limited thereto. Furthermore, the motor device 150 further include a converter 153. The converter 153 is coupled to the inverter 151, and provides a rectified voltage to the inverter 151. In addition, the converter 153 is, for example, a fill bridge rectifier, but the embodiment of the present invention is not limited thereto.

Please refer to FIG. 1. The motor detection device 100 may include a controller 110 and an encoder 120.

The controller 110 is coupled to the inverter 151 of the motor device 150. The controller 110 may provide the excitation current command to the inverter 151 of the motor device 150, so that the inverter 151 output the excitation current according to the excitation current command, so as to drive the motor device 150 (such as the motor 152) to rotate at the first angle and drive the motor device 150 (such as the motor 152) to rotate at the second angle.

In the embodiment, the first angle may be opposite to the second angle. In some embodiments, the angle range of the first angle is, for example, +45 degrees to +135 degrees, and the angle range of the second angle is, for example, −45 degrees to −135 degrees, but the embodiment of the present invention is not limited thereto. Further tore, the first angle is, for example, +90 degrees, and the second angle is, for example, −90 degrees.

The encoder 120 is coupled to the controller 110. The encoder 120 may detect a rotational position of the motor device 150 (such as the motor 152), and obtain a corresponding rotational angle. Furthermore, when the motor device 150 (such as the motor 152) rotates the first angle, the encoder 120 may detect and obtain the first feedback angle of the motor device 150 (such as the motor 152) in the first resting position. When the motor device 150 (such as the motor 152) rotates the second angle, the encoder 120 may detect and obtain the second feedback angle of the motor device 150 (such as the motor 152) in the second resting position. In the embodiment, the encoder 120 is, for example, a position sensor.

Then, the encoder 120 may provide the first feedback angle and the second feedback angle to the controller 110, and the controller 110 may calculate the magnetic pole offset angle of the motor device 150 (such as the motor 152) according to the first feedback angle and the second feedback angle. Therefore, the motor detection device 100 may effectively obtain the magnetic pole offset angle of the motor device 150 (such as the motor 152) in one learning procedure, so as to reduce the self-learning time and improve the learning accuracy.

In the embodiment, the calculation of the above magnetic pole offset angle may be expressed as equation (1).

$$\theta_{Mag(Cal)} = \frac{\theta_{P1} + \theta_{P2}}{2}, \quad (1)$$

wherein $\theta_{Mag(Cal)}$ is the magnetic pole offset angle, $\theta_{P1}$ is the first feedback angle, and $\theta_{P2}$ is the second feedback angle.

In the embodiment, due to the torque characteristics of the motor device 150 (such as the motor 152), the motor device 150 (such as the motor 152) has a position offset phenomenon when direct current excitation is performed. Therefore, when the controller 110 determines that the second feedback angle is greater than the first feedback angle, the controller 110 may add a third angle to the magnetic pole offset angle to generate a corrected magnetic pole offset angle. In the embodiment, the third angle is, for example, 180 degrees. In addition, the calculation of the above corrected magnetic pole offset angle may be expressed as equation (2).

$$\theta_{Mag(Cal)}^{Corr} = \frac{\theta_{P1} + \theta_{P2}}{2} + 180°, \quad (2)$$

when $$\theta_{P2} + \theta_{P1}$$

wherein $\theta_{Mag(Cal)}^{Corr}$ is the corrected magnetic pole offset angle.

Figure 2:
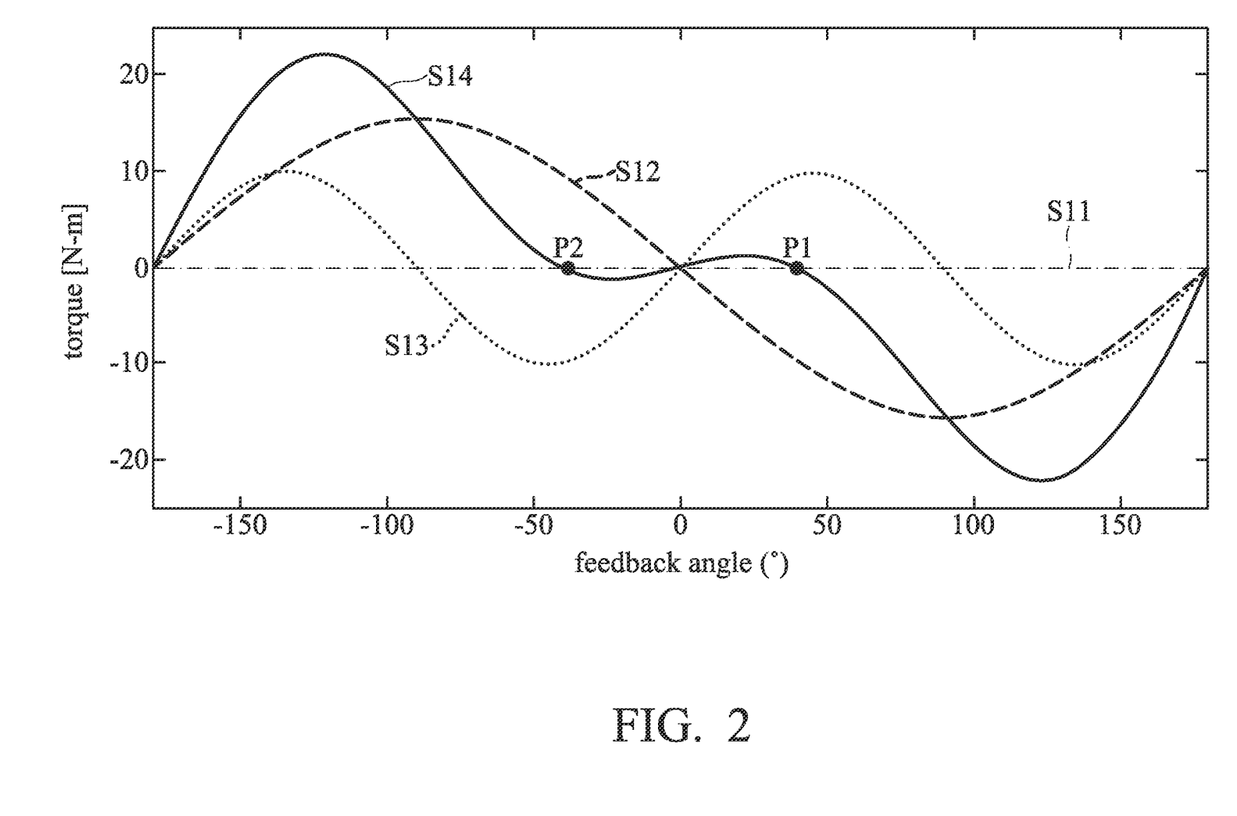
FIG. 2 is a waveform diagram of a torque and a feedback angle of a motor device according an embodiment of the present invention.

FIG. 2 is a waveform diagram of a torque and a feedback angle of a motor device according an embodiment of the present invention. In FIG. 2, curve S11 represents a zero torque of the motor device 150 (such as the motor 152), curve S12 represents an electromagnetic torque of the motor device 150 (such as the motor 152), curve S13 represents a reluctance torque of the motor device 150 (such as the motor 152), and curve S14 represents a total torque of the motor device 150 (such as the motor 152).

It can be seen from FIG. 2 that when the motor device 150 (such as the motor 152) performs the direct current excitation, the total torque of the motor device 150 (such as the motor 152) may be affected by the electromagnetic torque and the reluctance torque. In addition, after the motor device 150 (such as the motor 152) performs the direct current excitation to rotate at the first angle, a rotor of the motor device 150 (such as the motor 152) may stay, for example, in the first resting position P1, and the encoder 120 may detect and obtain the first feedback angle of the motor device 150 (such as the motor 152) in the first resting position P1. After the motor device 150 (such as the motor 152) performs the direct current excitation to rotate at the second angle, the rotor of the motor device 150 (such as the motor 152) may stay, for example, in the second resting position P2, and the encoder 120 may detect and obtain the second feedback angle $\theta_{P2}$ of the motor device 150 (such as the motor 152) in the second resting position P2. Then, the controller 110 may use the equation (1) to calculate the first feedback angle $\theta_{P1}$ and the second feedback angle $\theta_{P2}$ obtained by the encoder 120, so as to calculate the magnetic pole offset angle of the motor device 150 (such as the motor 152).

Figure 3:
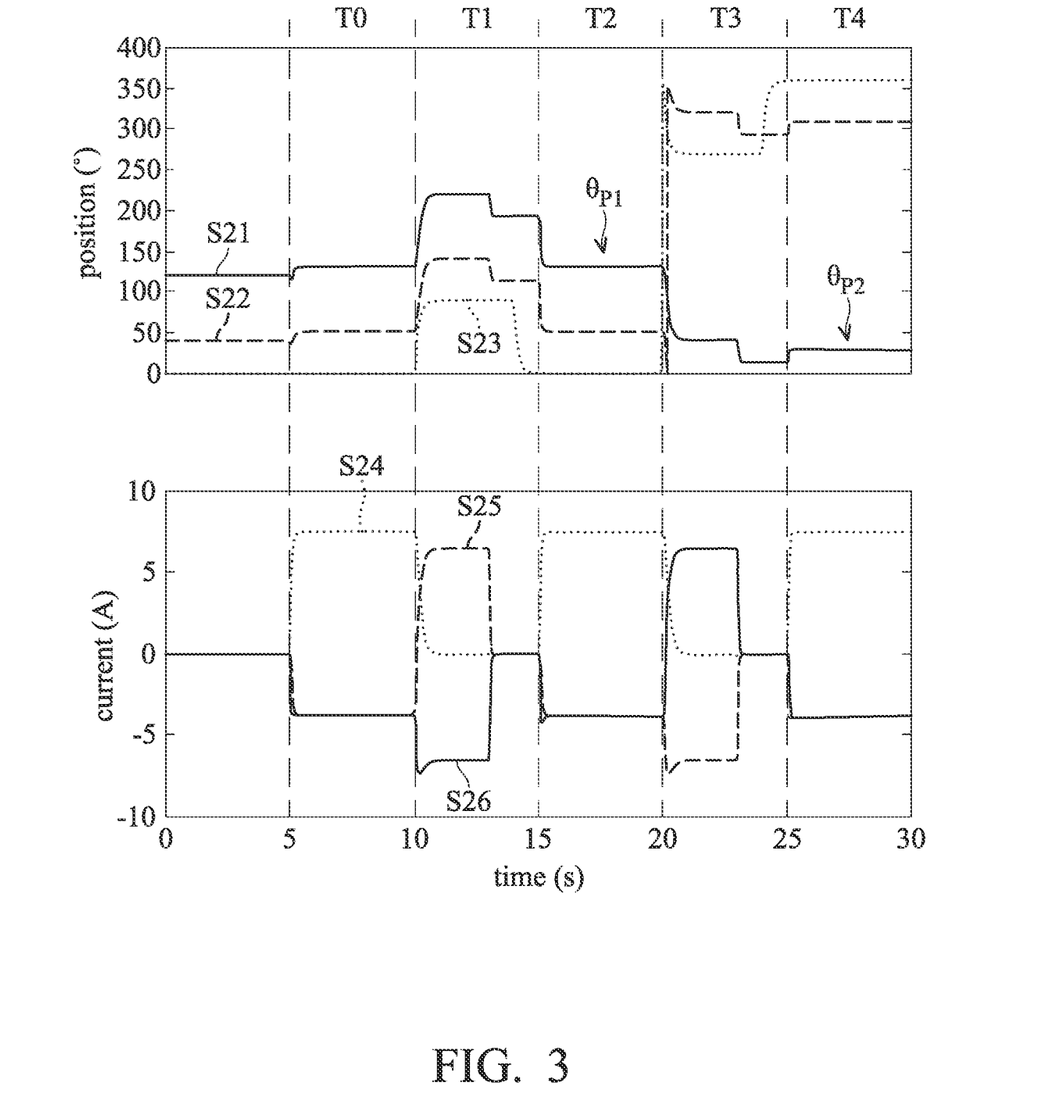
FIG. 3 is a timing chart of an operation of a motor detection device according another embodiment of the present invention.

FIG. 3 is a timing chart of an operation of a motor detection device according another embodiment of the present invention. Please refer to FIG. 3. T0, T1, T2, T3 and T4 are respectively different periods in operation, curve S21 represents a feedback angle of the encoder 120 of the motor device 150 (such as the motor 152), curve S22 represents an actual rotor angle of the motor device 150 (such as the motor 152), curve S23 represents a rotor angle of an estimated coordinate axis of the motor device 150 (such as the motor 152), curve S24 represents a first phase current $i_a$ of the three-phase currents $i_a$, $i_b$ and $i_c$, curve S25 represents a second phase current $i_b$ of the three-phase currents $i_a$, $i_b$ and $i_c$, and curve S26 represents a third phase current $i_c$ of the three-phase currents $i_a$, $i_b$ and $i_c$.

In the period T0, the controller 110 may provide the excitation current command to the inverter 151 of the motor device 150, and the inverter 151 may output the excitation current (such as the three-phase currents $i_a$, $i_b$ and $i_c$) according to the excitation current command to drive the motor device 150 (such as the motor 152), so that the rotor of the motor device 150 (such as the motor 152) rotates and stays in the first resting position P1 or the second resting position P2. Then, the controller 110 may determine whether the period T0 has ended. When the controller 110 determines that the period T0 has not ended, the controller 110 maintains the operation of the period T0. When the controller 110 determines that the period T0 has ended, the period T1 may be performed.

In the period T1, the controller 110 may control the inverter 151 to output the excitation current (such as the three-phase currents $i_a$, $i_b$ and $i_c$) according to the excitation current command to drive the motor device 150 (such as the motor 152), so that the rotor of the motor device 150 (such as the motor 152) rotates the first angle (such as +90 degrees). Then, the controller 110 may determine whether the period T1 has ended. When the controller 110 determines that the period T1 has not ended, the controller 110 maintains the operation of the period T1. When the controller 110 determines that the period T1 has ended, the period T2 may be performed.

In the period T2, the rotor of the motor device 150 (such as the motor 152) may stay, for example, in the first resting position (such as the first resting position P1), and the encoder 120 may detect and obtain the first feedback angle $\theta_{P1}$ of the motor device 150 (such as the motor 152) in the first resting position (such as the first resting position P1). In the embodiment, the first feedback angle $\theta_{P1}$ is, for example, 130.8 degrees. Since the initial angle of the motor device 150 is unknown, the direct current excitation is performed on the motor device 150 (such as the motor 152) in the period T0, so that the rotor of the motor device 150 (such as the motor 152) rotates and stays in the first resting position P1 or the second resting position P2, so as to ensure that the rotor of the motor device 150 (such as the motor 152) may stay in the first resting position P1 corresponding to the first feedback angle $\theta_{P1}$ in the period T2. Then, the controller 110 may determine whether the period T2 has ended. When the controller 110 determines that the period T2 has not ended, the controller 110 maintains the operation of the period T2. When the controller 110 determines that the period T2 has ended, the period T3 may be performed.

In the period T3, the controller 110 may control the inverter 151 to output the excitation current (such as the three-phase currents $i_a$, $i_b$ and $i_c$) according to the excitation current command to drive the motor device 150 (such as the motor 152), so that the rotor of the motor device 150 (such as the motor 152) rotates the second angle (such as −90 degrees). Then, the controller 110 may determine whether the period T3 has ended. When the controller 110 determines that the period T3 has not ended, the controller 110 maintains the operation of the period T3. When the controller 110 determines that the period T3 has ended, the period T4 may be performed.

In the period T4, the rotor of the motor device 150 (such as the motor 152) may stay, for example, in the second resting position (such as the second resting position P2), and the encoder 120 may detect and obtain the second feedback angle $\theta_{P2}$ of the motor device 150 (such as the motor 152) in the second resting position (such as the second resting position P2). In the embodiment, the second feedback angle $\theta_{P2}$ is, for example, 29.15 degrees. Then, the controller 110 may determine whether the period T4 has ended. When the controller 110 determines that the period T4 has not ended, the controller 110 maintains the operation of the period T4.

When the controller 110 determines that the period T4 has ended, the controller 110 may receive the first feedback angle $\theta_{P1}$ and the second feedback angle $\theta_{P2}$ obtained by the encoder 120, and the controller 110 may use equation (1) to perform a calculation processing on the first feedback angle $\theta_{P1}$ and the second feedback angle $\theta_{P2}$, so as to calculate the magnetic pole offset angle $\theta_{Mag(Cal)}$ of the motor device 150 (such as the 152). In the embodiment, the magnetic pole offset angle $\theta_{Mag(Cal)}$ is about, for example, 80 degrees. Therefore, the motor detection device 100 may effectively calculate the magnetic pole offset angle of the motor device 150 (such as the motor 152), and the above magnetic pole offset angle is used for correction to improve the driving performance of the motor device 150 (such as the motor 152) and the fault tolerance of the inverter 151.

In some embodiments, please continue to refer to FIG. 1. The controller 110 may include a position detection unit 111, a control unit 112, a current controller 113, a modulation unit 114, a current sensor 115 and a three-phase to two-phase converter 116, but the embodiment of the present invention is not limited thereto.

The position detection unit 111 is coupled to the encoder 120, and receives and outputs the rotational angle of the motor device 150 (such as the motor 152) obtained by the encoder 120, such as the first feedback angle of the motor device 150 (such as the motor 152) in the first resting position and the second feedback angle of the motor device 150 (such as the motor 152) in the second resting position.

The control unit 112 is coupled to the position detection unit 111. The control unit 112 may receive the first feedback angle and the second feedback angle, and generate a current command and a rotor angle of the estimated coordinate axis. The current controller 113 is coupled to the control unit 112, and receives the current command generated by the control unit 112 and estimated coordinate axis currents (such as a δ axis current $i_\delta$ and a γ axis current $i_\gamma$) to generate estimated coordinate axis currents (such as a δ axis voltage $v_\delta$ and a γ axis voltage $v_\gamma$).

The modulation unit 114 is coupled to the current controller 113, receives the estimated coordinate axis voltages (such as the δ axis voltage $v_\delta$ and the γ axis voltage $v_\gamma$) generated by the current controller 113, and performs a two-phase to three-phase conversion and a pulse width modulation on the estimated coordinate axis voltages (such as the δ axis voltage $v_\delta$ and the γ axis voltage $v_\gamma$) to generate the excitation current command, and the excitation current command is provided to the inverter 151. Then, the inverter 151 may output the excitation current (the three-phase currents $i_a$, $i_b$, and $i_c$) according to the excitation current command generated by the modulation unit 114 to drive the motor 152 to operate (for example, the motor 152 rotates the first angle or the motor 152 rotates the second angle).

The current sensor 115 is used to estimate the three-phase currents $i_a$, $i_b$ and $i_c$ of the motor device 150. Furthermore, the current sensor 115 is coupled to an output terminal of the inverter 151, and estimates the three-phase currents $i_a$, $i_b$ and $i_c$ output by the inverter 151 to generate detection currents (such as $i_a'$, $i_b'$ and $i_c'$) corresponding to the three-phase currents $i_a$, $i_b$ and $i_c$.

In some embodiments, the current sensor 115 is used to estimate the first phase current (such as $i_a$) and the second phase current (such as $i_b$) of the three-phase currents $i_a$, $i_b$ and $i_c$ output by the inverter 151 to generate the detection currents (such as $i_a'$ and $i_b'$) corresponding to the three-phase currents $i_a$, $i_b$ and $i_c$, and the controller 110 may calculate the detection current (such as corresponding to the third phase current (such as $i_c$) of the three-phase currents $i_a$, $i_b$ and $i_c$ according to the detection current (such as $i_a'$) corresponding to the first phase current (such as $i_c'$) and the detection current (such $i_b'$) corresponding to the second phase current (such as $i_b$). In some embodiments, the current sensor 115 may include a Hall sensor or a current sensing resistor, but the embodiment of the present invention is not limited thereto.

The three-phase to two-phase converter 116 is coupled to the current sensor 115, the control unit 112 and the current controller 113. The three-phase to two-phase converter 116 receives the detection currents (such as $i_c'$, $i_b'$, and $i_c'$) of the the three-phase currents $i_a$, $i_b$ and $i_c$ generated by the current sensor 115 and the rotor angle of the estimated coordinate axis generated by the control unit 112, and converts the detection currents (such as $i_a'$, $i_b'$ and $i_c'$) of the three-phase currents $i_a$, $i_b$ and $i_c$ into the two-phase estimated coordinate axis currents (such as the δ axis current $i_δ$ and the γ axis current $i_r$) according to the rotor angle of the estimated coordinate axis, and the two-phase estimated coordinate axis currents (such as the δ axis current $i_δ$ and the γ axis current $i_r$) are output to the current controller 113.

Figure 4:
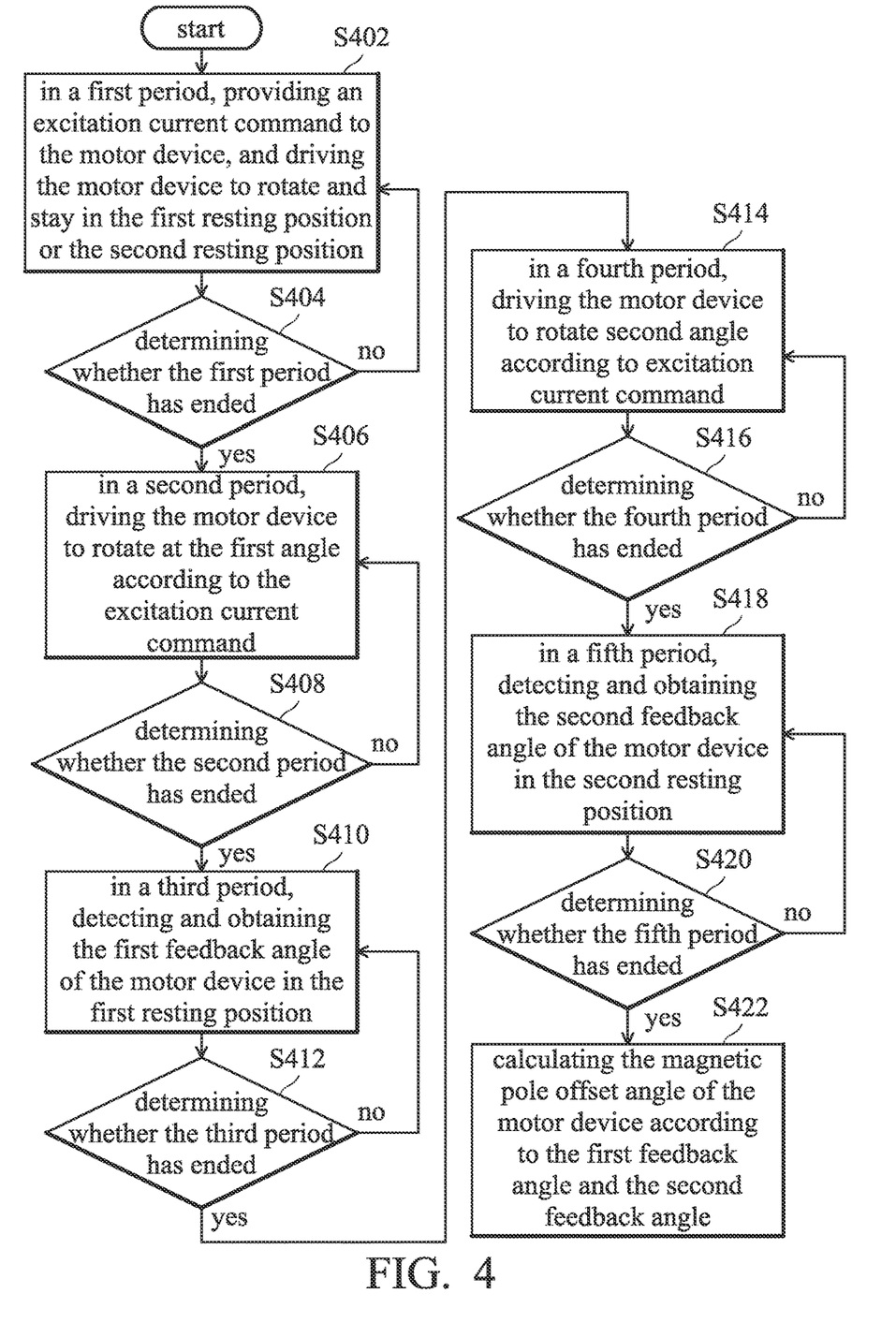
FIG. 4 is a flowchart of a motor detection method according an embodiment of the present invention.

FIG. 4 is a flowchart of a motor detection method according an embodiment of the present invention. In the embodiment, the motor detection method is suitable to detect a motor device. In step S402, the method involves in a first period, providing an excitation current command to the motor device, and driving the motor device to rotate and stay in the first resting position or the second resting position. In step S404, the method involves determining whether the first period has ended. When determining that the first period has not ended, the method returns to step S402. When determining that the first period has ended, the method performs step S406. In step S406, the method involves in a second period, driving the motor device to rotate at the first angle according to the excitation current command. In step S408, the method involves determining whether the second period has ended. When determining that the second period has not ended, the method returns to step S406. When determining that the second period has ended, the method performs step S410. In step S410, the method involves in a third period, detecting and obtaining the first feedback angle of the motor device in the first resting position.

In step S412, the method involves determining whether the third period has ended. When determining that the third period has not ended, the method returns to step S410. When determining that the third period has ended, the method performs step S414. In step S414, the method involves in a fourth period, driving the motor device to rotate second angle according to excitation current command. In step S416 the method involves determining whether the fourth period has ended. When determining that the fourth period has not ended, the method returns to step S414. When determinant that the fourth period has ended, the method performs step S418. In step S418, the method involves in a fifth period, detecting and obtaining the second feedback angle of the motor device in the second resting position. In step S420, the method involves determining whether the fifth period has ended. When determining that the fifth period has not ended, the method returns to step S418. When determining that the fifth period has ended, the method performs step S422. In step S422, the method involves calculating the magnetic pole offset angle of the motor device according to the first feedback angle and the second feedback angle.

In some embodiments, the first angle is opposite to the second angle. In some embodiments, the angle range of the first angle is, for example, +45 degrees to +135 degrees, and the angle range of the second angle is, for example, −45 degrees to −135 degrees. Furthermore, the first angle is, for example, +90 degrees, and the second angle is, for example, −90 degrees. In some embodiment, when the second feedback angle is greater than the first feedback angle, a third angle is added to the magnetic pole offset angle, so as to generate a corrected magnetic pole offset angle. Furthermore, the third angle is, for example, 180 degrees.

Figure 5:
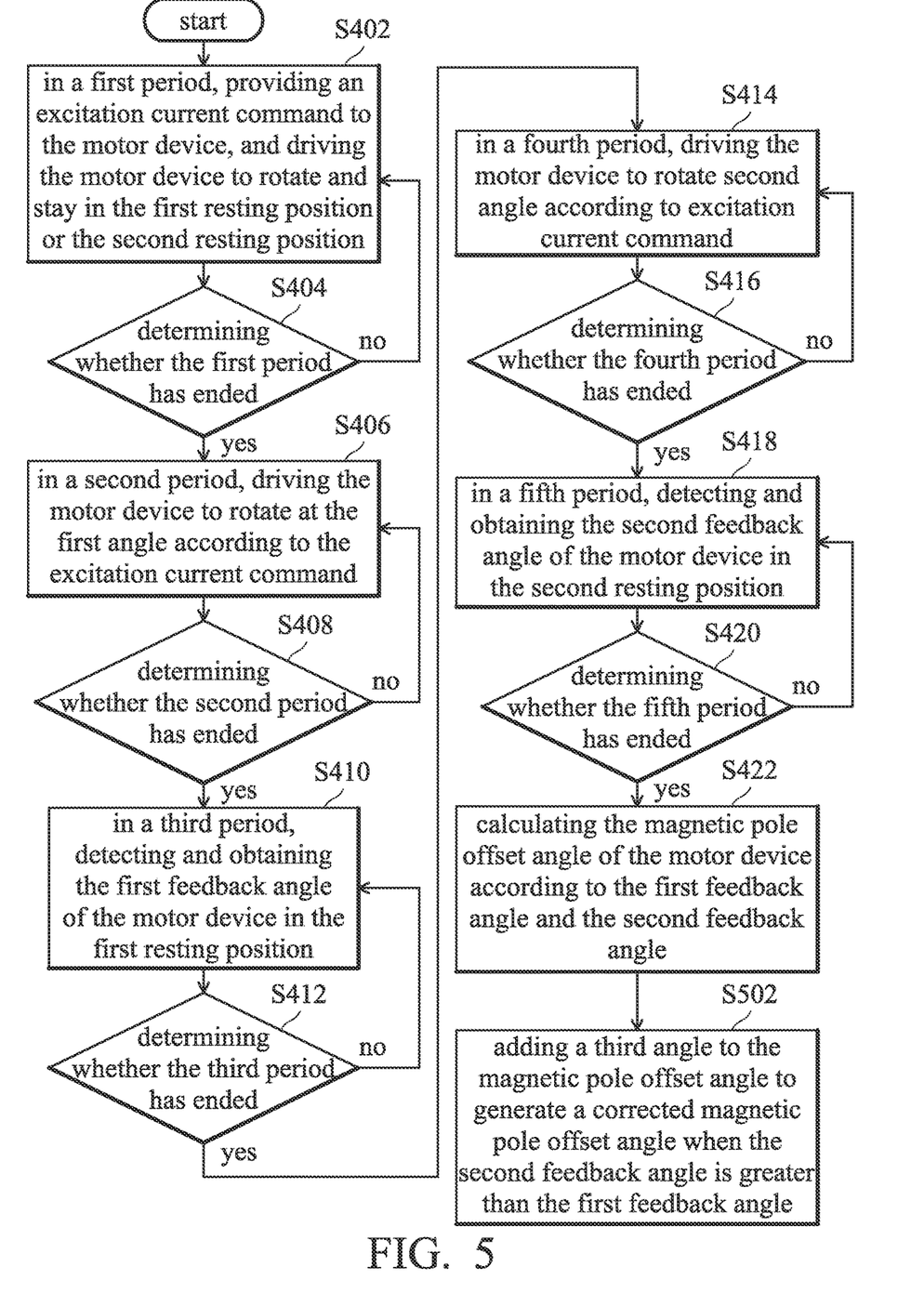
FIG. 5 is a flowchart of a motor detection method according another embodiment of the present invention.

FIG. 5 is a flowchart of a motor detection method according another embodiment of the present invention. In the embodiment, steps S402~S422 in FIG. 5 are the same as or similar to steps S402~S422 in FIG. 4. Accordingly, steps S402~S422 in FIG. 5 may refer to the description of the embodiment of FIG. 4, and the description thereof is not repeated herein. In step S502, the method involves adding a third angle to the magnetic pole offset angle to generate a corrected magnetic pole offset angle when the second feedback angle is greater than the first feedback angle. In the embodiment, the third angle is, for example, 180 degrees.

It should be noted that the order of the steps of FIG. 4 and FIG. 5 is only for illustrative purposes, and is not intended to limit the order of the steps of the present invention. The user may change the order of the steps above to meet specific requirements. The flowcharts described above may add additional steps or use fewer steps without departing from the spirit and scope of the present invention.

In summary, according to the motor detection method and the motor detection device disclosed by the embodiment of the present invention, the excitation current command is provided to the motor device and the motor device is driven to rotate at the first angle. The first feedback angle of the motor device in the first resting position is detected and obtained. The motor device is drove to rotate at the second angle according to the excitation current command. The second feedback angle of the motor device in the second resting position is detected and obtained. The magnetic pole offset angle of the motor device is calculated according to the first feedback angle and the second feedback angle. In addition, in the embodiment, when the second feedback angle is greater than the first feedback angle, the third angle is added to the magnetic pole offset angle to generate the corrected magnetic pole offset angle. Therefore, the correct magnetic pole offset angle may be effectively detected and obtained, so as to reduce the self-learning time and improve the learning accuracy, and the above magnetic pole offset angle may be used for correction to improve the driving performance of the motor device and the fault tolerance of the inverter.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A motor detection method, suitable to detect a motor device, wherein the motor detection method comprises:
providing an excitation current command to the motor device, and driving the motor device to rotate at a first angle;
detecting and obtaining a first feedback angle of the motor device in a first resting position;
driving the motor device to rotate at a second angle according to the excitation current command;
detecting and obtaining a second feedback angle of the motor device in a second resting position; and
calculating a magnetic pole offset angle of the motor device according to the first feedback angle and the second feedback angle;
wherein the first resting position and the second resting position are positions that combine a total torque of the motor device is zero, and the first resting position is different from the second resting position.

2. The motor detection method as claimed in claim 1, wherein the first angle is opposite to the second angle.

3. The motor detection method as claimed in claim 2, wherein an angle range of the first angle is +45 degrees to +135 degrees, and an angle range of the second angle is −45 degrees to −135 degrees.

4. The motor detection method as claimed in claim 3, wherein the first angle is +90 degrees, and the second angle is −90 degrees.

5. The motor detection method as claimed in claim 1, further comprising:

adding a third angle to the magnetic pole offset angle to generate a corrected magnetic pole offset angle when the second feedback angle is greater than the first feedback angle.

6. The motor detection method as claimed in claim 5, wherein the third angle is 180 degrees.

7. A motor detection device, suitable to detect a motor device, wherein the motor detection device comprises:

a controller, configured to provide an excitation current command to a motor device, drive the motor device to rotate at a first angle, and drive the motor device to rotate at a second angle; and an encoder, configured to detect and obtain a first feedback angle of the motor device in a first resting position and a second feedback angle of the motor device in a second resting position;

wherein the controller calculates a magnetic pole offset angle of the motor device according to the first feedback angle and the second feedback angle;

wherein the first resting position and the second resting position are positions that combine a total torque of the motor device is zero, and the first resting position is different from the second resting position.

8. The motor detection device as claimed in claim 7, wherein the first angle is opposite to the second angle.

9. The motor detection device as claimed in claim 8, wherein an angle range of the first angle is +45 degrees to +135 degrees, and an angle range of the second angle is −45 degrees to −135 degrees.

10. The motor detection device as claimed in claim 9, wherein the first angle is +90 degrees, and the second angle is −90 degrees.

11. The motor detection device as claimed in claim 7, wherein when the second feedback angle is greater than the first feedback angle, the controller further adds a third angle to the magnetic pole offset angle to generate a corrected magnetic pole offset angle.

12. The motor detection device as claimed in claim 11, wherein the third angle is 180 degrees.

* * * * *